United States Patent

Rencken

Patent Number: 5,957,984
Date of Patent: Sep. 28, 1999

[54] METHOD OF DETERMINING THE POSITION OF A LANDMARK IN THE ENVIRONMENT MAP OF A SELF-PROPELLED UNIT, THE DISTANCE OF THE LANDMARK FROM THE UNIT BEING DETERMINED DYNAMICALLY BY THE LATTER

[75] Inventor: Wolfgang Rencken, Erding, Germany

[73] Assignee: Siemens Aktiengesellschaft, Munich, Germany

[21] Appl. No.: 08/809,276

[22] PCT Filed: Sep. 5, 1995

[86] PCT No.: PCT/DE95/01204

§ 371 Date: Mar. 5, 1997

§ 102(e) Date: Mar. 5, 1997

[87] PCT Pub. No.: WO96/07959

PCT Pub. Date: Mar. 14, 1996

[30] Foreign Application Priority Data

Sep. 6, 1994 [DE] Germany .............................. 44 31 752

[51] Int. Cl.⁶ ..................................................... G05D 1/02
[52] U.S. Cl. .............................................. 701/23; 701/300
[58] Field of Search ................................. 701/23, 25, 300, 701/301, 225; 348/116; 702/165

[56] References Cited

U.S. PATENT DOCUMENTS

| | | | |
|---|---|---|---|
| 4,809,178 | 2/1989 | Ninomiya et al. | 364/443 |
| 5,363,305 | 11/1994 | Cox et al. | 364/443 |
| 5,402,051 | 3/1995 | Fujiwara et al. | 318/587 |
| 5,677,836 | 10/1997 | Bauer | 364/424.027 |
| 5,684,695 | 11/1997 | Bauer | 364/424.027 |

FOREIGN PATENT DOCUMENTS

| | | |
|---|---|---|
| 3709627 | 10/1988 | Germany . |
| 4138270 | 5/1993 | Germany . |
| 4324531 | 1/1994 | Germany . |
| WO 87/07056 | 11/1987 | WIPO . |

OTHER PUBLICATIONS

5TH Symposium On Robotics Research, 1989, Philippe Moutarlier et al, Stochastic Multisensory Data Fusion For Mobile Robot Location And Environment Modelling, pp. 85–94.

Autonomous Robot Vehicles, Springer Verlag, 1990, Randall Smith et al, Estimating Uncertain Spatial Relationships In Robotics, pp. 167–193.

Vol. 179 in Mathematics In Science and Engineering, Thomas E. Fortmann, Tracking and Data Association, pp. 52–109.

The Kluwer International Series in Engineering and Computer Science, John J. Leonard et al, Directed Sonar Sensing for Mobile Robot Navigation, pp. 51–139.

*Primary Examiner*—Michael J. Zanelli
*Attorney, Agent, or Firm*—Hill & Simpson

[57] ABSTRACT

The method solves the problem of assigning surveyed landmarks to landmarks in an environment map by each measured value being compared with a predicted measured value which has previously been calculated on the basis of an earlier measurement. A dynamic limit is prescribed for this system error. The assignment of a measured value to a landmark and hence the determination of the position of this landmark in the environment is ensured by the system error being positive and falling below a specific value. In the event that such an assignment is no longer possible, the limit is dynamically raised, specifically until the ratio of predicted landmarks to assigned landmarks falls below a specific value. In order to avoid endless loops in the method, which may be produced by no assignment being possible, the method is broken off after a specific number of loops. The method is suitable for robots in domestic, office and industrial environments, as well as for transport vehicles.

12 Claims, 1 Drawing Sheet

METHOD OF DETERMINING THE POSITION OF A LANDMARK IN THE ENVIRONMENT MAP OF A SELF-PROPELLED UNIT, THE DISTANCE OF THE LANDMARK FROM THE UNIT BEING DETERMINED DYNAMICALLY BY THE LATTER

BACKGROUND OF THE INVENTION

In the prior art there are numerous possible uses for autonomously operating mobile units. In this connection, one thinks of remote sensing probes, of mobile units which operate in danger areas, of self-propelled industrial vacuum cleaners, of transport vehicles in the production industry and, not least, of self-propelled robots. However, in order to be able to fulfil a practical task in an a priori unknown environment, an autonomous mobile robot must be able both to construct a reliable map of its working environment step by step and to locate itself at any given time using this map. Because of the very complex and unstructured environments in which such self-propelled units may possibly manoeuvre, their areas of use often remain restricted to office and domestic environments. Since in general an a priori map is not available, such a self-propelled unit must be equipped with sensors which allow the unit to interact in a flexible manner with its environment. Some such sensors are laser distance scanners, video cameras and ultrasonic sensors, for example.

A particular problem of these mobile units is that the formation of the environment map and the locating of the mobile unit depend on each other. In the process, various errors occur. On the one hand, such a mobile unit measures the distance covered from a starting position, on the other hand it uses distance sensors to measure the distance to obstacles which occur and enters these as landmarks in the environment map. Since these errors accumulate and add up over relatively long distances, practical manoeuvrability of the mobile unit is no longer given above a specific limit.

Previous solution formulations for this problem are based on the fact that characteristic landmarks in the environment are detected and their positions relative to the mobile unit are measured. From these relative positions of the landmarks and the absolute position of the unit, the absolute locations of the landmarks are determined. All the sensor measurements are generally affected by uncertainties. For this reason, methods are used with which the best possible estimation for the position of the mobile unit and the positions of the landmarks are found at the same time. Previously there has been a wide variety of formulations for solving this problem.

In a method by Leonard and Durrant-Whyte Directed Sonar Sensing for Mobile robot Navigation (pp. 51–65; pp. 97–111; pp. 129–138); Kluwer Academic Publishers, Boston, London, Dordrecht, 1992, the uncertainty relations between the landmarks and the mobile unit are not taken into account. Thus, on the one hand, the computing time is drastically reduced but, on the other hand, the errors between the predicted and measured sensor values cannot be assigned to the respective error sources. In order to ensure stability of the method, it is necessary to presuppose that the mobile unit can detect landmarks very accurately when stationary. Very accurate sensors are thus required, which in turn, because of their high costs, also limit the practical use of this method formation.

General statements about map building and about the motion of mobile units in cartographic environments can be taken from Y. Bar-Shalom and T. E. Fortmann, Tracking and Data Association (pp. 52–61; pp. 100–109). Academic Press, 1988 Directed Sonar Sensing for Mobile robot Navigation (pp. 51–65; pp. 97–111; pp. 129–138); Kluwer Academic Publishers, Boston, London, Dordrecht, 1992.

In order that a mobile robot can determine its position within its environment, the current sensor measurements must be correlated with an internal map, that is to say it must be decided which measurement agrees with which landmark in the map. From the assignment, the current robot position can then be estimated. If the solutions which are used result in few erroneous measurements, it is possible to find an assignment for each measurement. If, however, erroneous measurement often occur, it is only possible to-assign those measurements which, with high probability, agree with a landmark. For this purpose, a so-called validation gate method Y. Bar-Shalom and T. E. Fortmann, Tracking and Data Association (pp. 52–61; pp. 100–109), Academic Press, 1988; and Directed Sonar Sensing for Mobile robot Navigation (pp. 51–65; pp. 97–111; pp. 129–138); Kluwer Academic Publishers, Boston, London, Dordrecht, 1992 is used. This method calculates, on the basis of the difference between the measurement and the predicted measurement of the associated landmark and its respective uncertainties, the probability that the assignment is correct. For example, only those assignments whose statistical distance lies below a specific limit are accepted. If this limit is small, only very statistically closely adjacent, and thus extremely certain, assignments are allowed. If the differences between the measurements and the predicted measurements of the associated landmarks remain small over time, this functions very well. In a real environment, however, this rapidly leads to problems if landmarks are hidden by unknown objects. As long as the landmarks are hidden, no assignments are made in a correct manner. If, thereafter, the landmarks become visible once more, it may be the case that the estimated robot position has in the meantime become so erroneous, because of the slip of the drive wheels, that assignment can no longer be carried out because of the strict criterion, and the self-propelled mobile unit finally becomes lost in its environment. On the other hand, if this limit is selected to be too large, improbable assignments will also be allowed. The risk that false assignments will then be made is very large, with the consequence that disastrous errors which cannot be eliminated again later can be made in determining the position of the unit. In the solutions cited, on the basis of empirical experience, the parameter is selected such that an acceptable assignment is carried out in most cases.

SUMMARY OF THE INVENTION

The invention is based on the object of specifying a method using which an improved assignment of measurement results to the associated landmarks in the environment map of an autonomous mobile unit is possible, and hence the determination of the position of the unit in the environment is improved.

In general terms the present invention is a method of determining the position of a landmark in the environment map of a self-propelled unit, the distance of the landmark from the unit being determined dynamically by the latter. At least by the unit, a position change is determined by at least one first measuring means arranged on the unit. By the unit, at least one distance of a first obstacle in the environment relative to the unit is determined by at least one second measuring means arranged on the unit, and is entered in the environment map as first landmark. At least at a starting position, the position of the unit and the location of the first landmark in the environment map correspond to the real relationships in the environment. After a movement away of the unit, at least one first own position of the unit relative to the starting position is determined with a position uncertainty. From the first own position, at least one first distance to the first obstacle is determined with a position uncertainty and a first distance to a suspected second obstacle, a determining landmark, is measured. From a second own position, at least one second distance to the suspected second obstacle is measured. For the second own position, using the first distance and the position change between the first own position and the second own position, a predicted second distance to the first and to the second obstacle is calculated. As the first and second system error, at least the difference between the measured second distance to the suspected second obstacle and the calculated predicted second distance to the first and to the suspected second obstacle is determined. For determining the position of the first landmark, the latter is allocated the position of the suspected second obstacle in the environment map if the magnitude of the second system error falls below a fixed unit and is positive.

From at least two chronologically successive system errors, a probability is calculated for the size of the system error. Only such landmarks as are located in front of the unit in the direction of travel are determined.

In the event that the position of a landmark can no longer be determined, since the system error is becoming too large, the limit is raised.

The raising of the limit can be carried out only to the extent to which the ratio of the number of determined landmarks to the number of predicted landmarks does not exceed a fixed value, the reliability limit.

The method carried out repeatedly and for the case in which no location of a landmark can be determined, the number of repetitions is restricted.

An odometer is used as first measuring means.

A distance meter is used as second measuring means.

The measurement inaccuracy of at least one measuring means is added to the system error.

The measurement inaccuracy of at least one measuring means is partitioned and one part is added to the position uncertainty and another part to the location uncertainty.

The system error at time k is determined to be $$v(k+1) = z(k+1) - \hat{z}(k+1|k)$$

and uncertainty of the system error results therefrom as $$S(k+1) = \nabla h_{\hat{x}(k+1|k)} P(k+1|k) \nabla h^T_{\hat{x}(k+1|k)} + \nabla h_{\hat{p}t(k+1|k)} \Lambda_t$$
$$(k+1|k) \nabla h^T_{\hat{p}t(k+1|k)} + R(k+1)$$

from which the statistical distance between the measurement and the predicted measurement is derived as $$d(k) = v(k+1) S^{-1}(k) v^T(k+1)$$

and $$d \leq \gamma^2$$

is prescribed as the fixed value which is a limit with $\gamma_{max} = \gamma_{min} + n_{max}$ as prescribed range, where n is the maximum number of possible iterations, with a measurement error R(k+1) where

| | |
|---|---|
| $v(k+1)$ | is the system error at time k + 1 |
| $\hat{z}(k+1\|k)$ | is the calculated predicted landmark distance at time k + 1 with $\hat{z}(k+1\|k) = h(\hat{x}(k+1\|k), \hat{p}_t(k+1\|k))$ |
| $\hat{x}(k+1\|k)$ | is the predicted own position of the unit at time k + 1 |
| $\hat{p}_t(k+1\|k)$ | is the predicted landmark position of the unit at time k + 1 |
| $\nabla h_{\hat{A}(k+1\|k)}$ | is the jacobean of the function h, modulus $\hat{p}_t(k+1\|k)$ |
| $\nabla h_{\hat{x}(k+1\|k)}$ | is the jacobean of the function h, modulus $\hat{x}(k+1\|k)$ |
| $P(k+1\|k)$ | is the covariance matrix of $\hat{x}(k+1\|k)$ at time k + 1 |
| $\Lambda_t(k+1\|k)$ | is the covariance matrix of $\hat{p}_t(k+1\|k)$ at time k + 1 |
| Indices $\hat{}$ | indicate predicted value. |

In one embodiment R(k+1)=0 applies.

In another embodiment the following limits apply: $\gamma_{max} = 4$, $\gamma_{min} = 2$ $n_{max} = 3$ and, as reliability limit, 1.5.

A particular advantage of the method according to the invention consists in the fact that measurements which cannot be assigned unambiguously to a landmark can be distinguished in relation to the associated landmark via the system error and a prescribed positive limit. The positive limit in this case means that the predicted value should be smaller than the current measured value. Thus, it is advantageously ensured by the method according to the invention that, in dynamically changeable environments, for example when an obstacle gets between a landmark and the self-propelled mobile unit between two measurement intervals, this landmark is not allocated a false value.

In an advantageous manner, by means of the method according to the invention, from the quantity of landmarks which are present in the environment map only those are evaluated which are located within an area in front of the unit in the direction of travel.

In a particularly advantageous manner, as a result of the method according to the invention, no fixed limit is placed on the system error, but rather, this unit is made dynamic. Thus, the position of landmarks which can be determined only inaccurately can still be assigned to an object in the environment map.

In a particularly advantageous manner, the inaccuracy which is produced by raising the limit in the inventive method for the inherent system error is restricted by continuously checking how the number of determined landmarks behaves in relation to the number of predicted landmarks. A rise in the number of determined landmarks could signify, for example, double assignments. Such occurrences are advantageously avoided thereby. In order to be able to end the method when no determination of the position of a landmark is possible, a limit is advantageously prescribed for its number of cycles.

The use of an odometer as distance meter for the method according to the invention is particularly favorable in the case of wheel-driven vehicles.

Depending on the field of use of the mobile unit, a cost-effective distance meter, with which landmarks can be detected, can favorably be used for the method according to the invention.

It is advantageous to take into account the measurement uncertainty of the sensor for the distance measurement, since in this way the current position or its uncertainty of a landmark can be detected more accurately.

In a particularly advantageous manner, the number of possible iterations n is included for the upper limit of $\gamma$, in order to achieve a practical accuracy in determining the position of the landmarks. It is advantageous for office environments to select the values 2 for $\gamma_{min}$, 4 for $\gamma_{max}$, 3 for $n_{max}$ and 1.49 as the reliability ratio.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

BRIEF DESCRIPTION OF THE PREFERRED EMBODIMENTS

Figure 1:
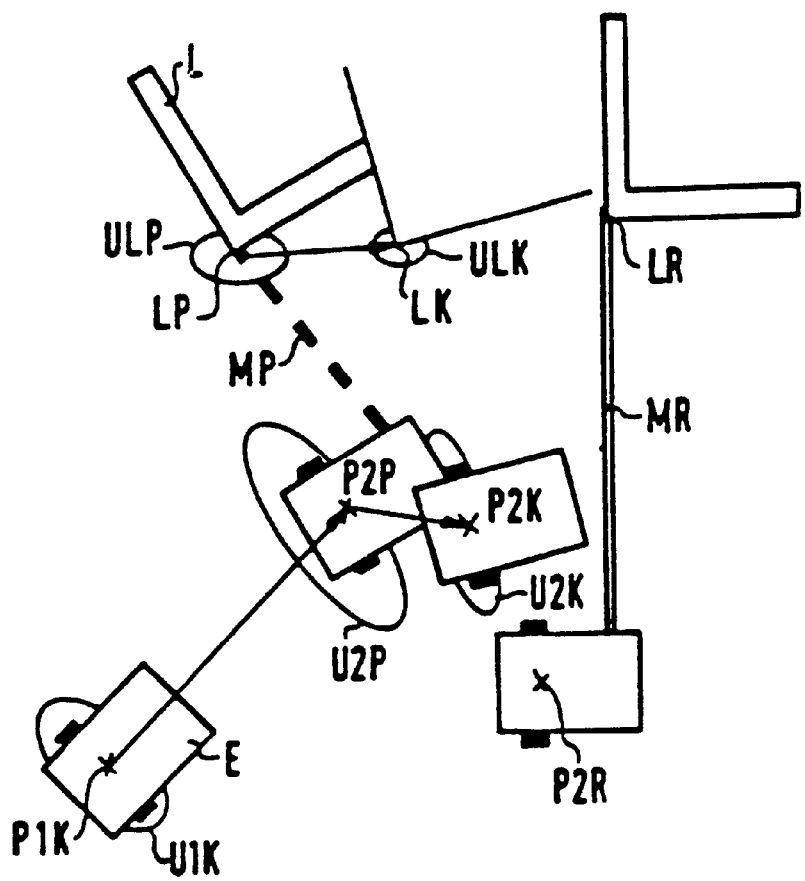
FIG. 1 shows a self-propelled unit in an environment.

The fundamentals of the method according to the invention are shown in FIG. 1 in order to explain the terms. A mobile unit E is shown in various positions which are characteristic for the method according to the invention. Furthermore, a landmark L can be seen, the location of which is determined.

At the beginning of its movement, the mobile unit E is located here, for example, at a position P1K, which is subject to an uncertainty U1K. This position uncertainty is represented by an ellipse. Following a movement operation, the unit is located at a position P2P. This position P2P is a predicted position, that is to say on the basis of the measurements using an odometer, for example, the mobile unit should now be located at the position P2P in relation to the starting position P1K. However, this position P2P does not correspond to the real residence location of the unit in the environment, since the distance measurement is subject to error. The position P2P is stored as current position, for example in an environment map in an orientation computer of the mobile unit, and is entered as the current position in the environment map. On the basis of a distance measurement, carried out from the position P1K, to the landmark in LR, a distance MP from the position P2P to the assumed location LP of the landmark is now predicted. The location LP of the landmark L in this case has an uncertainty ULP which is represented by an ellipse.

However, the position P2P is not the real position which is assumed by the unit. In actual fact, it is located at the position P2R. By means of a measurement using a distance meter, for example a laser radar or an ultrasonic sensor, the real distance of the unit MR from the location of the landmark LR is now determined. It should be noted here that neither the position P2R nor the location LR of the landmark has an uncertainty, since these are the real positions. In the event that use is made of distance meters which have an error, it would be necessary to take this error into account here. However, its processing is not necessary for carrying out the method according to the invention.

As is described in more detail in the cited literature, the position of a mobile unit is, for example, described in the form of coordinates and in the form of an orientation which specifies an angle of rotation of the unit in the coordinate system. From this, it can be seen that a distance measurement is also a function of the rotational orientation of the mobile unit in a coordinate system. For example, these rotational orientations and the distance are to be taken into account in correcting the position and the landmark of the mobile unit.

Since the variables which are a precondition for the method according to the invention are now available, this method can be carried out.

This means that the real distance MR is now compared with the predicted distance and, for example, the difference v is formed. This difference has an uncertainty as a function of the location uncertainty ULP and of the position uncertainty U2P. This uncertainty may, for example, be appropriately partitioned and the location of the landmark and the position of the mobile unit in the environment map can be corrected with the respective component. One then obtains for the landmark, for example, the position LK with an uncertainty ULK, in which case care should be taken that the uncertainty ULK is smaller than the uncertainty ULP. For the mobile unit, after carrying the method according to the invention, one obtains the position P2K with an uncertainty U2K, it being true once more that this uncertainty U2K is smaller than the uncertainty U2P.

When using these new values for a further step of the method according to the invention in the starting map, it is possible to settle on a smaller uncertainty and hence determine new positions of the unit and new locations of landmarks with a greater accuracy.

Figure 2:
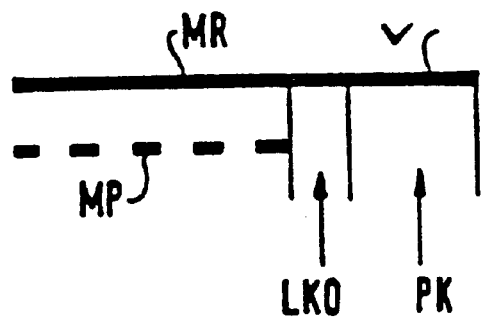
FIG. 2 shows the partitioning of the system error.

FIG. 2 illustrates the calculation of the system error in accordance with the method according to the invention. The real measurement MR and the predicted distance measurement MP are shown. The difference between these two distances yields the system error v, for example. This system error is now partitioned, for example into a location correction LKO and a position correction PK. The partitioning is carried out for example in accordance with the size of the respective uncertainty with which the determination of position or the determination of location is affected. Using the location correction LKO, the location of a landmark may be corrected and, using the position correction PK, the position of the mobile unit in the environmental map may be reestablished. Here, care should be taken that, during the correction, both the position of the mobile unit in a coordinate system at a specific time and the direction of rotation of the mobile unit are to be taken into account.

The correction of the respective positions or location may then be carried out by applying the corresponding angular functions to the coordinate values. During the assignment of a measured value from a landmark to a landmark present in the environmental map, this error is useful as a limit for the reliability of an assignment. In this case, the error should, for example initially, not exceed a fixed value.

The method according to the invention is based on a dynamically varied validation gate variable. An attempt is firstly made, using a strict criterion, to assign the measurements to the landmarks and hence to determine their position in the environmental map and the position of the mobile unit in relation thereto. If sufficient assignments are found, for example a specific percentage of the predicted assignments are actually accepted, then only those assignments which fulfill this strict criterion are selected. If this is not possible, for one of the reasons outlined at the beginning, the validation gate is enlarged somewhat, in order also to allow somewhat less certain assignments. This operation is continued until, for example, the allowed assignments exceed a specific percentage of the predicted assignments, or else a maximum number of steps has been carried out. The latter is also necessary, since in specific situations, if for example a region has been completely altered, it is never possible to fulfil the percentage criterion. For example, for the relationship between the initial size $\gamma_{min}$, the maximum size $\gamma_{max}$ and the maximum number of iterations, the following formula is selected:

$\gamma_{max} = \gamma_{min} + n_{max}$

The procedure may for example be as follows:

1) Calculate, using the formulae 1 to 3, for each possible assignment the corresponding statistical distance d(k). The set of these assignments is identified by M(k). In this case, the formulae are:

$$v(k+1) = z(k+1) - \hat{z}(k+1|k) \quad (1)$$

$$d(k) = v(k+1)S^{-1}(k)v^T(k+1) \quad (2)$$

$$S(k+1) = \nabla h_{\hat{x}(k+1|k)} P(k+1|k) \nabla h_{\hat{x}(k+1|k)}^T + \nabla h_{\hat{p}t(k+1|k)} \Lambda_t \quad (3)$$
$$(k+1|k) \nabla h_{\hat{p}t(k+1|k)}^T + R(k+1)$$

2) Select, from M(k), the assignments whose distance is smaller than $\gamma_{max}^2$. The new set is identified by $M_{max}$.

3) Select, from $M_{max}$, the assignments with v>0, since the landmarks are assumed not to be hidden. The new set is identified by $M_{vis}$. This step is necessary since otherwise erroneous assignments are made in the case of a relatively large validation gate.

4) The number of predicted assignments $N_{pred}$ results from the cardinal number of $M_{vis}$. The number of accepted assignments is identified by $N_{acc}$.

5) Set $\gamma = \gamma_{min}$, n=0 and $N_{acc}$=0.

6) From the set $M_{max}$, look for the assignments which are accepted on the basis of formula (4).

$$d \leq \gamma^2 \quad (4)$$

7) If it is true that $N_{acc}/N_{pred} \leq T$ and n<$n_{max}$, increment n and hence γγ. T is the percentage threshold.

8 Repeat steps 6 and 7 until the conditions for breaking off are satisfied.

By way of example, in quite typical office environments, values of $\gamma_{min}$=2, $\gamma_{min}$=4, $n_{max}$=3 and T=0.6 result in an increase of up to 200% in the accuracy of the determination of the position of landmarks by contrast with conventional methods.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method of determining a position of a landmark in an environment map of a self-propelled unit, a distance of the landmark from the unit being determined dynamically by the unit, comprising the steps of:

a) determining, at least by the unit, a position change using at least one first measuring device arranged on the unit;

b) determining, by the unit, at least one distance of a first obstacle in the environment relative to the unit using at least one second measuring device arranged on the unit, and entering the first obstacle in the environment map as a first landmark;

c) corresponding, at least at a starting position of the unit, the position of the unit and the location of the first landmark in the environment map to real relationships in the environment;

d) determining, after a movement of the unit away from the starting position, at least one first position of the unit relative to the starting position with a position uncertainty;

e) determining, from the first position of the unit, at least one first distance to the first obstacle with a location uncertainty and measuring a first distance to a suspected second obstacle, a determining landmark;

f) measuring, from a second position of the unit, at least one second distance to the suspected second obstacle;

g) calculating, for the second position of the unit, using the first distance to the first obstacle and a position change between the first position of the unit and the second position of the unit, a predicted second distance to the first obstacle and to the suspected second obstacle;

h) determining, as a system error, at least a difference between the measured second distance to the suspected second obstacle and the calculated predicted second distance to the suspected second obstacle; and i) allocating, for determining the position of the first landmark, the position of the first landmark to the position of the suspected second obstacle in the environment map if a magnitude of the system error falls below a fixed value and is positive.

2. The method as claimed in claim 1, wherein, from at least two chronologically successive system errors, a probability is calculated for a magnitude of the system error, and wherein only such landmarks as are located in front of the unit in a direction of travel are determined.

3. The method as claimed in claim 1, wherein the fixed value is a limit and wherein when the position of a landmark can no longer be determined, since the system error is becoming too large, the limit is raised.

4. The method as claimed in claim 3, wherein raising of the limit can be carried out only to an extent that a ratio of a number of determined landmarks to a number of predicted landmarks does not exceed a further fixed value, which is a reliability limit.

5. The method as claimed in claim 1, wherein the method is carried out repeatedly and wherein when no location of a landmark is determinable, the number of repetitions is restricted.

6. The method as claimed in claim 1, wherein the first measuring device is an odometer.

7. The method as claimed in claim 1, wherein the second measuring device is a distance meter.

8. The method as claimed in claim 1, wherein measurement inaccuracy of at least one measuring device of the first and second measuring devices is added to a system error.

9. The method as claimed in claim 1, wherein measurement inaccuracy of at least one measuring device of the first and second measuring devices is partitioned and wherein one part of the measurement inaccuracy is added to the position uncertainty and another part of the measurement inaccuracy is added to the location uncertainty.

10. The method as claimed in claim 1, wherein system error at time k is determined to be $$v(k+1) = z(k+1) - \hat{z}(k+1|k)$$

and uncertainty of the system error results therefrom as $$S(k+1) = \nabla h_{\hat{x}(k+1|k)} P(k+1|k) \nabla h^T_{\hat{x}(k+1|k)} + \nabla h_{\hat{p}_{t(k+1|k)}} \Lambda_t (k+1|k) \nabla h^T_{\hat{p}_{t(k+1|k)}} + R(k+1)$$

from which the statistical distance between the measurement and the predicted measurement is derived as $$d(k) = v(k+1) S^{-1}(k) v^T(k+1)$$

and $$d \leq \gamma^2$$

is prescribed as the fixed value which is a limit with $\gamma_{max} = \gamma_{min} + n_{max}$ as prescribed range, where n is the maximum number of possible iterations, with a measurement error R(k+1) where

| | |
|---|---|
| $v(k+1)$ | is the system error at time k + 1 |
| $\hat{z}(k+1|k)$ | is the calculated predicted landmark distance at time k + 1 with $\hat{z}(k+1|k) = h(\hat{x}(k+1|k), \hat{p}_t(k+1|k))$ |
| $\hat{x}(k+1|k)$ | is the predicted own position of the unit at time k + 1 |
| $\hat{p}_t(k+1|k)$ | is the predicted landmark position of the unit at time k + 1 |
| $\nabla h_{\hat{A}(k+1|k)}$ | is the jacobean of the function h, modulus $\hat{p}_t(k+1|k)$ |
| $\nabla h_{\hat{x}(k+1|k)}$ | is the jacobean of the function h, modulus $\hat{x}(k+1|k)$ |
| $P(k+1|k)$ | is the covariance matrix of $\hat{x}(k+1|k)$ at time k + 1 |
| $\Lambda_t(k+1|k)$ | is the covariance matrix of $\hat{p}_t(k+1|k)$ at time k + 1 |
| Indices | indicate predicted value. |

11. The method as claimed in claim 10, wherein R(k+1)= 0.

12. The method as claimed in claim 10, wherein $\gamma_{max}=4$, $_m\gamma_n=2$, $_{max}n=3$ and the reliability limit is 1.5.

* * * * *